United States Patent [19]

Reynolds

[11] 3,996,834
[45] Dec. 14, 1976

[54] FASTENING ELEMENT

[75] Inventor: Richard L. Reynolds, Palos Verdes, Calif.

[73] Assignee: Litton Systems, Inc., Beverly Hills, Calif.

[22] Filed: Sept. 17, 1975

[21] Appl. No.: 614,197

Related U.S. Application Data

[63] Continuation-in-part of Ser. No. 458,235, April 5, 1974, abandoned.

[52] U.S. Cl. .................................. 85/32 V; 10/86 F
[51] Int. Cl.[2] .................................. F16B 37/00
[58] Field of Search ............ 85/32 V, 32 R, 36, 35; 151/21 C, 14 R; 10/86 R, 86 F, 86 A

[56] References Cited

UNITED STATES PATENTS

| | | | |
|---|---|---|---|
| 1,977,861 | 10/1934 | Pond | 85/32 R X |
| 3,010,126 | 11/1961 | Willcox | 10/86 F X |
| 3,263,949 | 8/1966 | Conrad | 85/36 X |
| 3,314,326 | 4/1967 | Bedford | 85/32 V |
| 3,364,807 | 1/1968 | Holton | 85/36 |
| 3,388,732 | 6/1968 | Holton | 85/36 X |
| 3,583,274 | 6/1971 | Duffy | 85/32 V |

Primary Examiner—Ramon S. Britts
Attorney, Agent, or Firm—Richard Zentner; Donald J. Ellingsberg

[57] ABSTRACT

Disclosed herein is a fastening element which is susceptible of forming a fastener assembly by engagement with a self-tapping screw. An oblique rib is formed within a bore within a blank, or other structural element, close to the end of the bore. The rib is thus oriented at an angle with respect to the axis of the bore. The result is a rib of substantially eliptical configuration protruding radially inwardly into the bore exclusively from locations along a substantially elliptical closed-loop line upon the cyindrical surface of the bore, the closed-loop line having two turning points of reversal in axial direction component by virtue of the closed-loop line returning into itself. Also disclosed is a void in the rib, and dimensions of the fastener relative to standard externally threaded fasteners which are preferred for high strength and easy driving.

20 Claims, 12 Drawing Figures

FASTENING ELEMENT

This application is a continuation-in-part of the application Ser. No. 458,235, filed Apr. 5, 1974, entitled TAPPING SCREW STRAIGHT START BORE, now abandoned.

FIELD OF THE INVENTION

The present invention relates to fastening elements of the type intended for use with self-tapping screws, and more particularly provides a fastening element susceptible of forming a fastener assembly by engagement with a self-tapping screw.

DESCRIPTION OF THE PRIOR ART

Self-tapping threaded fasteners are well known and frequently preferred in applications where it is possible to use a metal screw which is harder than the material of a structural element, such as a blank through which a threadless bore for the screw has been made. Such screw can be rotatably driven into the bore, thereby forming mating female threads. In many cases, the efficiency and thus the usefulness of such an operation is problematic, particularly because, at the beginning of each operation, considerable pressure must be applied by means of the conventionally used power-driven tool to cause the self-tapping screw to properly start winding itself into the material adjacent the cylindrical surface defining the threadless bore. Moreover, difficulties may be encountered when the bore is originally, or becomes, oriented at such an angle relative to a driven self-tapping screw that the screw is not in perfect alignment with the axis of the bore. Then, the screw may become permanently askew, i.e. it does not seat properly. Such problems have been acute where, for representative example, the bore axis extends horizontally and the screw is driven from a position relatively higher than, or relatively lower than the axis. In many such attempts, the threads of the self-tapping screw which are designed to form threads within the bore upon proper engagement then are mangled or otherwise distorted. The resulting assembly, if one is formed at all, may have significantly impaired holding characteristics, for the underside of the screw head itself may be damaged and thus weakened. Even the entire fastening may be weakened and put in jeopardy. Moreover, the cocked, i.e. askew, screw head may have roughened the surface of the structural element containing the bore such that it would not hold paint, or such that the thickness of such element may be reduced and consequently the entire assembly became weak. The askew screw head appearance also is undesirable. Frequently, then a new screw must be driven into the bore. In some situations, even a new bore must be formed.

The terms "screw" and "threaded fastener" are used herein interchangeably to designate an elongated fastener having at least one thread formed helically about at least portions of its elongated shank. As a rule, in the great majority of instances, there is only one continuous thread of numerous turns upon the shank of a fastener. In this description, a self-tapping screw shall be a screw that is capable of forming a mating thread, or threads, in an already existing bore. Such a self-tapping screw, in most instances, has at least two portions along its shank, of which one portion is substantially cylindrical having a helically wound thread thereupon, and the other portion is substantially conical or frusto-conical having a continuing helically wound thread thereupon. The conical portion extends from the cylindrical portion and, usually but not necessarily, ends in a point. The cylindrical portion and the conical portion thus have a common axis. Whenever alignment of the screw is stated, alignment of this axis is meant to be referred to.

It is known to provide a bore in structural elements with internal protrusions in order to facilitate the maintenance of axial alignment of a self-tapping screw when driven thereinto, see, for example, U.S. Pat. Nos. 3,364,807 and 1,977,861. Such constructions, however, are complicated, have proven expensive in manufacture and are effective only in nut bore construction. A structural device which can be made economically by a very simple stamping process and within any bore as described herein has not been known, however.

Particularly with reference to U.S. Pat. No. 3,364,807, it may be considered to be a typical example representing the state of the art, inasmuch as it provides a protrusion from the internal surfaces of a bore in a nut, which, upon assembly with a self-tapping screw, will be deformed into a mating female thread, thus intended to solve the same problems that are also solved by the present invention. However, the solution in accordance with this known development is unsatisfactory, inasmuch as its limitations lead to further problems.

As explained in that patent, the configuration of the rib is quite complicated and, in a sense, asymmetrical such that the originator must propose to produce the rib by enlarging a previously drilled bore in a broaching step. This well-known technology involves not only cutting away of material, but also requires appropriate equipment, skilled operators and, moreover, the procedure is expensive and time-consuming for various reasons. As a major disadvantage of this method for producing the intricately shaped rib in accordance with the teaching of the presently discussed U.S. Pat. No. 3,364,807, it can be seen that a broaching process can hardly be performed unless the initial threadless bore extends all the way through the nut. In sharp contrast, as can be seen from the detailed description further below, the present invention permits fast and easy formation of the desirable rib within a threadless bore, even if the bore does not extend all the way through the body which will receive a self-tapping screw. Since there is an enormous demand for assemblies using self-tapping screws in connection with heavy structures which would not permit making the bore which will receive the self-tapping screw all the way through the body, this advantage should not be overlooked, as it solves a problem which has existed heretofore.

As a further point of interest in connection with the development in accordance with U.S. Pat. No. 3,364,807, its workability is based on a deformation of the entire configuration of the nut with the bore wherein the rib has been provided. It has been found that such deformation, which constitutes a necessary requirement in accordance with this and various other known developments, is highly undesirable. Whenever the material used in the fabrication of the nut is a steel of inferior quality, inasmuch as it exhibits the brittleness which is a known property of inexpensive steels, it can easily occur that the nut cracks or even completely breaks into pieces whenever the self-tapping screw is driven into it. Again, in sharp contrast with this disadvantage of known developments, the present invention does not rely upon deformation or changes in configuration of the external shape of the solid body into which the self-tapping screws are intended to be assembled. As an important consequence of this achievement, the solid body, having a bore with a rib which will receive the self-tapping screw, need not be of high-quality material. What is even more important, it need not be a nut, but can be an entire structure, such as, for example, an extended, thick steel plate, because, as mentioned above, the solid body will not be deformed as a whole, of course except for the formation of a female thread which occurs exclusively within the material adjacent the bore.

In accordance with another, earlier development disclosed in U.S. Pat. No. 3,388,732, it has been proposed to provide a rib within a bore for purposes which are similar to the purpose of the present invention. However, in accordance with that development, the rib is specified to be of helical configuration, and illustrated to occupy only an arc of the periphery of the bore. As a result, such rib does not follow a closed-loop line, but rather constitutes a fraction of an internal thread, in the form of a short portion of a turn of such thread which will be engaged and, as explained, deformed upon assembly with a self-tapping screw. However, since this fractional internal turn of a thread of this development does not return into itself to form a closed loop, it can be seen that it cannot possibly contribute to an alignment of the self-tapping screw when it is assembled with the fastening element of this prior art development.

SUMMARY OF THE INVENTION

In accordance with a broad aspect of the invention, there is provided a fastening element for forming a fastener assembly by engagement with a self-tapping screw, comprising a solid body having a threadless cylindrical surface defining a bore having an axis and extending into said solid body, and at least one rib of substantially elliptical configuration protruding radially inwardly into said bore exclusively from locations along a substantially elliptical closed-loop line upon said cylindrical surface of said bore, said closed-loop line having two turning points of reversal in axial direction component, providing a maximum and minimum in axial extent of the elliptical rib. Generally speaking, the rib is thus defined between two planes each oriented entirely obliquely with respect to the axis of the bore.

The oblique orientation of the rib results in an arrangement in which the rib has two substantially elliptically ring-shaped major surfaces, each of the major surfaces lying in a plane forming an acute angle with a plane intersecting the cylinder axis at right angles. Moreover, due to displacement of material in greater quantities, the deeper an area of the rib seats in the bore, the more material has been displaced. Then, the two major surfaces can be visualized to form a relatively small angle between one another, with the thickness of the rib as defined between the two surfaces increasing with the depth of the rib.

Whenever it is desired to ensure that no cracking or breaking can occur, and particularly for use in forming fastening assemblies with large bodies, the rib is provided in an area of the solid body at which the wall thickness of the solid body is sufficiently great that assembly with the self-tapping screw cannot cause significant distortion of the external shape of the solid body.

In accordance with additional features of embodiments of the invention, the rib is adjacent an end of the bore. There may be provided two ribs, each adjacent a distinct one of the two ends of the bore, thus avoiding the need to inspect the fastening element prior to assembly, since, then, one or the other end of the bore is prepared for cooperation with a self-tapping screw. A particularly useful fastening element is obtained when the overall external configuration of the solid body is that of a nut having substantially the same external dimensions along its height. Alternatively, the overall external configuration of the solid body may be that of a flat plate.

In accordance with another broad aspect of the invention, the threadless bore is specially dimensioned for engagement by a standard size self-tapping screw or other externally threaded fastener. More specifically, the threadless bore is provided with a formed rib adjacent the end of the bore, and preferably spaced from the end at a distance less than 15 percent or 20 percent of the diameter of the bore from the end of the bore. The diameter of the bore between the rib and the surface of the body in which the bore is located is greater than the outer diameter of the standard externally threaded fastener with which it is to be used, and the diameter of the bore beyond the rib is less than the outer diameter but greater than the pitch diameter of the standard fastener. With these proportions and configuration, the standard self-tapping screw is properly aligned. Upon assembly with the self-tapping externally threaded fastener, at least one fully formed thread is obtained from the rib, i.e. close to the end of the bore where maximum strength is required. In addition, driving torque is relatively low as the self-tapping screw passes the rib and forms only partial threads in the remaining bore where the bore diameter is greater than the pitch diameter of the standard screw and where the stress on the threads will be lower. When a nut-type geometry of the fastening element is used, a second rib is employed adjacent the opposite end of the bore, so that the additional thread which is fully formed from the second rib provides improved prevailing torque characteristics.

As a still further feature of suitable embodiments, the rib has at least one interruption, in the form of a location where there is no rib, constituting a void. Preferably, there will be two voids at diametrically opposite locations. The two voids may be at equal distances from an end of the bore.

BRIEF DESCRIPTION OF THE DRAWINGS

The invention will become better understood from the following detailed description of various embodiments thereof, when taken in conjunction with the drawings, wherein.

DESCRIPTION OF THE ILLUSTRATED EMBODIMENT

With reference to FIGS. 1 through 5, a sheet, i.e. plate, 10 of generally metallic material is provided with one or several bores 12 having axes 14. Each of the bores 12 has a threadless, i.e. substantially smooth, cylindrical surface 18, except for the locations of a rib, as can be seen better in the cross-sectional views, such as FIGS. 2 through 4.

Figure 1:
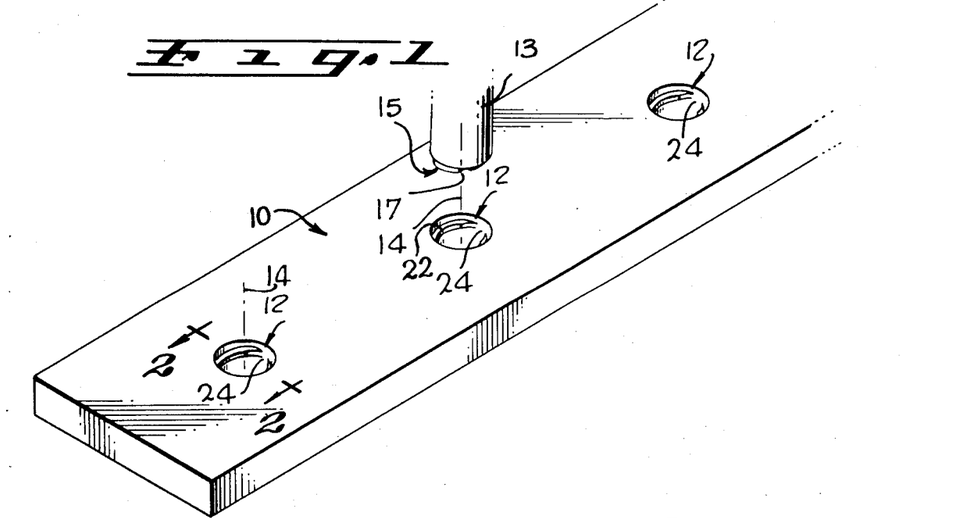
FIG. 1 is a perspective view of a plate with bores and ribs, as well as a stamping tool, illustrating one embodiment of a method for producing a fastener of the invention.
Figure 2:
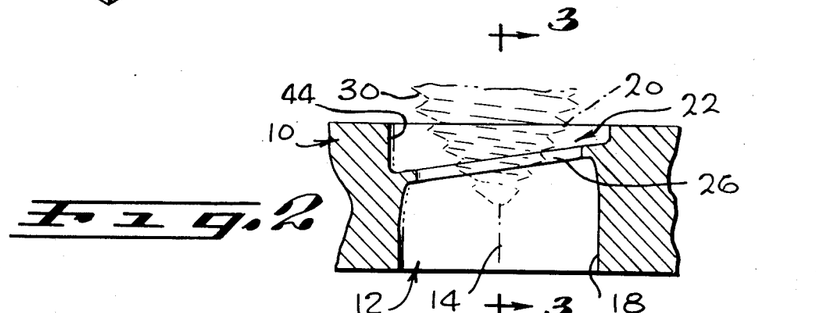
FIG. 2 is a cross-sectional view taken along line 2—2 of FIG. 1.

In FIG. 2, one bore 12 of FIG. 1 is illustrated in cross-sectional view taken along line 2—2 of FIG. 1. The plate, or sheet material structure 10 may be a metal strip, a portion of a metal frame, a solid body of any useful shape and material or a conventional fastening nut, as the description of the invention in the form of a conventional fastening nut is given in further detail below. In the view of FIG. 2, the tapering pilot end of a self-tapping screw 20 having threads 30 is shown in phantom lines, as if it were in the process of being driven into the bore 12, at high rotational speed.

The bore 12 within the plate 10 has a rib 22 which extends from surface 18 toward the axis 14. The rib 22 is almost annular, extending substantially around the 360° from locations along a substantially elliptical closed-loop line upon the surface 18, with interruptions 24, as described in detail further below. Significantly, the rib is constructed to occupy the space between two entirely obliquely oriented planes. Thus, the overall orientation of the rib is not normal to the axis 14 of the bore 12. The closed-loop line of locations from which the rib protrudes has thus two turning points of reversal in axial direction component by virtue of the closed-loop line returning into itself. Interiorly, the rib may have an edge 26 which follows the elliptical line.

The rib 22 protrudes inwardly from the surface 18 of the bore 12 for a substantial portion of the 360° around the bore 12. The rib 22, however, preferably has at least one void 24, best seen in FIGS. 1, 3, 4 and 5 of the drawings. These voids 24, having the appearance of notches, are provided along the edge 26 of the rib 22 which vanishes as it merges into the interior surface 18 of the bore 12.

As illustrated in the drawings, the embodiments described are assumed to be constructed with the rib 22 having one interruption, in the form of a location where there is no rib, constituting the void 24. Suitably, there will be two such voids 24 at diametrically opposite locations, preferably with the two voids 24 at equal distances from an end of the bore 12.

In the accompanying drawings, the bore 12 with the rib 22 may appear to be machined or precast. While such a method of construction may, theoretically, prove suitable insofar as the structural end product is concerned, it is highly impractical, because of its relatively expensive and inefficient operation. Consequently, the rib 22 will preferably be punch-formed, i.e. stamped, by means of an inexpensive stamping tool having its forming end specially shaped for the task. Thus, for example, after bore 12 has been drilled or otherwise made in a solId body, such as plate 10, a stamping tool 13, shown in FIG. 1, whose cylindrical shank is oriented coaxially to the axis 14, is driven partially into the bore 12.

The forming end surface 15 of the stamping tool 13 is oriented in a plane non-normal to the axis of the tool 13, i.e. downwardly in FIG. 1. Consequently, the forming surface 15 of the cylindrical tool shank will, in essence, be elliptical in shape, and thus produce an essentially elliptical rib. Even though the surface is not visible in FIG. 1, it is easy to visualize that, in order to produce the rib as for example shown in FIG. 2, the forming end, with the surface 15, of the stamping tool 13 must have a profile which corresponds to the upper hollow space within the body 10 of FIG. 2. This upper space in FIG. 2 is that between the plane of the upper surface of the body 10, the upper bore surface 44 and the upper surface of the obliquely oriented elliptical rib 22. It will be realized that the length of the diameter of the tool 13, i.e. of the cylindrical shank from which the tool is illustrated as having been produced, must slightly exceed that of the diameter of the bore 12, because, during the stamping step, the marginal area of the forming surface 15 of the tool 13 will drive material from around the end of the bore into the bore and thus form the rib 22, as clearly illustrated and described further below. Simultaneously, a slightly enlarged recess will be formed at the end of the bore 12.

Thus, it will be clear that the forming surface 15 of the stamping tool 13 will engage the end of bore 12 to be reformed in a gradual manner, i.e. with the most extended point of the forming surface 15 engaging the material around the bore 12 first. The stamping tool 13, consequently, will suitably be operated by means of a press or other equipment, not shown, which will maintain it coaxial with the axis 14 of bore 12, against the unbalancing forces of the askew surface 15, while it is driven into the bore.

The stamping tool 13, further, may be shaped having recesses 17 at specific locations of its forming surface 15, as shown in FIG. 1. Such recesses 17 form the notches or voids 24 if they are desired. The significance of the voids 24 is discussed in detail further below.

In FIG. 1, the stamping tool 13 is shown positioned over the center bore 12 as if it were retracting after having formed the rib 22 with a void 24 within the central bore 12, but then rotated to illustrate the recess 17. Thus stamping tool 13 should be driven into the solid body 10 a short distance, thus creating the surface 44 of the bore 12 having a longer diameter than the bore 12, to form the recess at the end of the bore, as seen in the drawings.

In such a rib-forming operation, the material of the plate 10 surrounding the bore 12 adjacent the end through which the forming tool 13 enters the bore 12 is gathered and reformed into the rib 22. Thus, the diameter of the bore 12 adjacent the end, i.e. the recess as defined by the cylindrical surface 44, will have become longer. The diameter of the bore 12 on the opposite side of rib 22, i.e. the lower side as viewed in FIGS. 2, 3 and 4, may be reformed by the gathering of material adjacent surface 18 so that the diameter of this portion of bore 12 may have become shorter than the original bore diameter.

It should be emphasized that the stamping, or forming, tool 13 is shown as being used in a representative method of forming the rib 22 within the bore 12. Several other highly satisfactory methods of forming the rib 22 may be used. For example, the rib 22 may be formed when the bore itself is formed, as in situations where the bore is formed when the plate 10, or the nut 40 of FIGS. 7 through 11, is cast. Also, as discussed above, the rib 22 may be machined.

Figure 6:
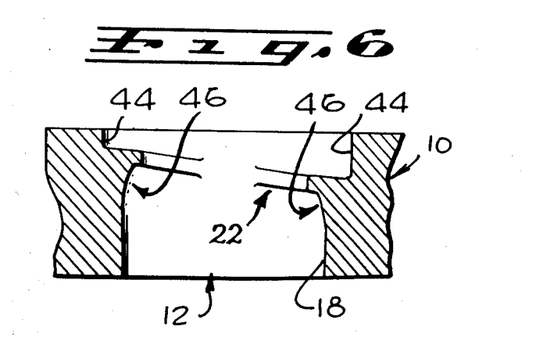
FIG. 6 is a cross-sectional view similar to that of FIG. 4, with slightly changed proportions.

In practice, and as best illustrated in FIG. 6, where the use of a wider tool forming a relatively large countersink opening or recess with the cylindrical wall surface 44 is assumed, the diameter of that portion of the bore 12 which is opposite from the tool usually becomes shorter, because of the gathering of material within the bore 12 by the force of the forming, i.e. stamping, operation, it is believed. Thus, when the tool 13 is forced, i.e. driven, into the bore 12, a small quantity of the material is grouped to form the enlarged ring 46 of gathered material below the rib 22 and extending substantially annularly toward the axis of the bore 12. Still, the rib may be viewed as having two substantially elliptically ring-shaped major surfaces.

The relatively clean lines in the accompanying drawings are shown primarily for clarity. In practice, the edges will be filleted and rounded. Indeed, the edge 26 may be completely rounded. As a result of the stamping method, the diameter of that portion of the bore 12 which is on the side of the rib 22 formed by the tool will always be longer than the diameter of the portion of the bore 12 on the opposite side, unless a second rib has been formed at the opposite side.

Figure 7:
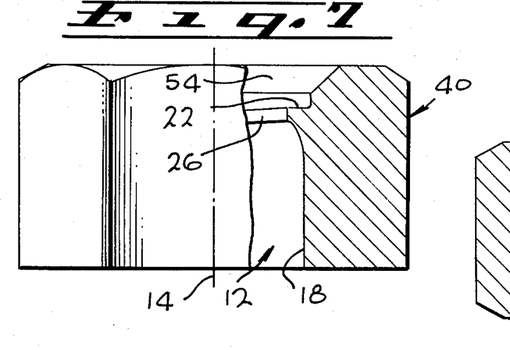
FIG. 7 is a cutaway, partly sectional view of a different embodiment of the invention involving a nut.
Figure 11:
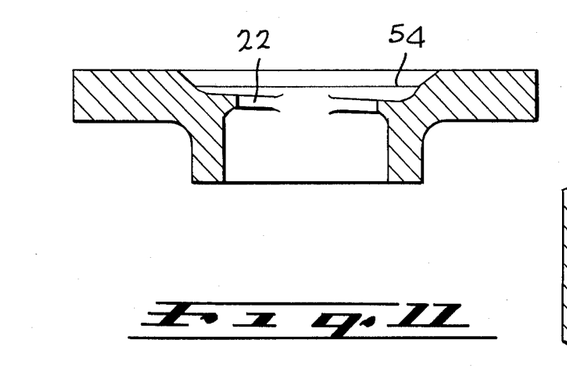
FIG. 11 is a sectional view of a still further embodiment of the invention.

For the purpose of further enhancing the usefulness of the fastening element herein described, the bore ends may be chamfered, if desired. Such a chamfer 54 is illustrated in FIGS. 7 and 11, and may be formed in any conventional manner desired, several such methods being well known in the art. Preferably, the chamfer will be formed after the rib 22 is formed, so that the chamber is not distorted by the rib-forming process.

It is to be particularly noted that, under use of the stamping method for making the fastening element of the invention as described herein, the quantity, i.e. the precise volume, of material in the finished product after the forming of the rib 22 within the bore 12 is the same as that existing before the stamping, because material of the blank is displaced but no material is removed from the blank, such as plate 10 of FIG. 1. In such a manner, the presence of sufficient material to form complemental female threads in the bore 12 from the surface 18 when a self-tapping screw 20 having a cutting thread or forming thread 30 is driven into the initially threadless bore 12 is insured.

As the plane of orientation of the rib 22 is oblique with respect to axis 14, as described and illustrated, the angle may be either greater than, or it may be smaller than, the pitch angle of the thread 30 of the self-tapping screw 20. Various such constructions have been used with fully satisfactory results. It is believed that a rib orientation angle corresponding to the pitch angle of the screw thread will prove equally satisfactory.

From the illustrations in figures thus far discussed, it can be seen that one of the essential features of the rib 22 is the existence of the two extreme points at which reversal in axial direction component occurs. Particularly with reference to FIGS. 2, 4 and 6, in these cross sections the reversal points appear within the plane of the drawing, to the left-hand side and to the right-hand side. Thus, it will be realized that, for example in FIG. 2, the area of rib 22 which is shown to the right-hand side, which is the uppermost area, is the reversal point of direction of the rib at a location of maximum height, when the fastener is considered in the illustrated vertical position, and, conversely, the left-hand side shows the lowermost point of the rib which is the other point of reversal. This is so because, when following the general line of direction of the rib, such as along the edge 26, the component of direction which is defined by its projection upon the axis 14 will reverse its sense when passing through these points of reversed axial direction component.

Figure 3:
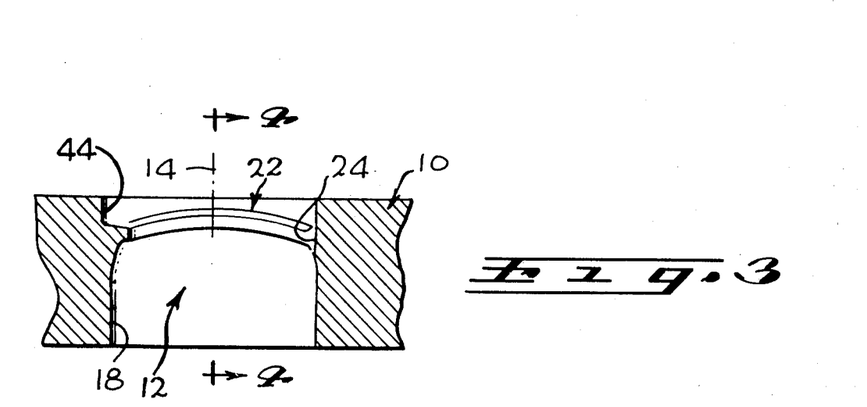
FIG. 3 is a cross-sectional view taken along line 3—3 of FIG. 2.
Figure 4:
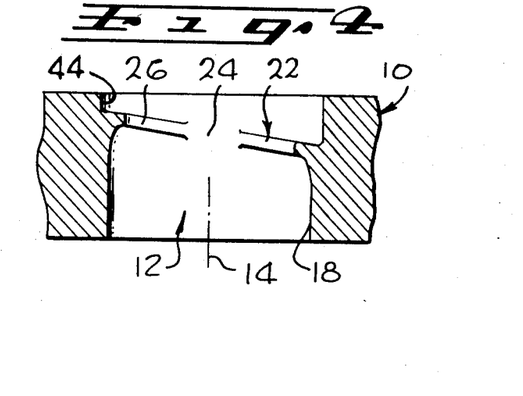
FIG. 4 is a cross-sectional view taken along line 4—4 of FIG. 3.
Figure 5:
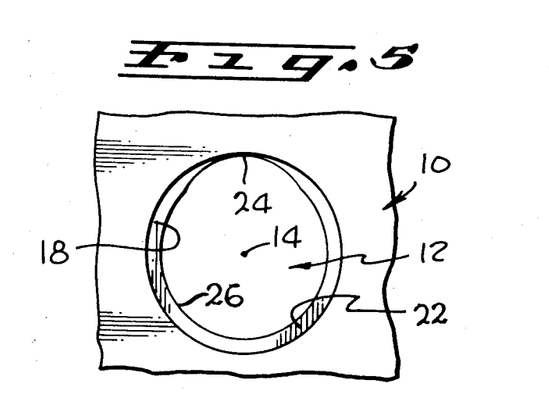
FIG. 5 is a top view of a portion with one of the bores of the plate of FIG. 1.

These conditions are also clearly illustrated in FIG. 3 where the upper reversal point of rib 22 coincides with the centerline of the figure, because in the axial cross section of FIG. 3 the highest point of the rib 22 lies directly behind the axis 14.

Referring now to FIG. 7, the fastening element is embodied in an otherwise conventional nut 40 with the bore 12. In similarity with the embodiment of FIGS. 1 through 6, the rib 22 extends from locations along an elliptical line upon the surface 18 of the bore 12 into the interior of the bore 12 toward the axis 14 of the nut 40. The rib 22 optionally can have one void or two voids corresponding to voids 24 but not visible in the view of FIG. 7.

In operation, the bores 12, whether formed in sheet material, such as plate 10, or formed in a nut 40, operate in the same manner. Specifically, a self-tapping screw 20, such as that indicated in phantom lines in FIG. 2, is inserted under rotation into the bore 12, either manually or by powered means of a power-operated hand tool. The tip of the screw 20, thus, rotatingly advances into the hole in the oblique, elliptically annular rib 22. The thread 30 engages the rib 22. The occurring deformation of the rib 22 and of the surface 18 of the bore 12 as it is being engaged by the self-tapping, thread-forming screw 20 is understood to be that which is produced whenever fastening elements of similar nature are assembled in this manner, namely the formation of a mating internal, i.e. female, thread within the solid body, namely the rib 22 of plate 10 or the nut 40. This occurs firstly at different locations along the rib and always without any other substantial deformation of the body which, thus, does not undergo a change in external configuration. From a practical point of view, the wall thickness of the nut 40 is sufficiently great that assembly with the self-tapping screw 20 cannot cause any significant distortion of the external shape of the nut. Thus, it can easily be seen from the drawings or from the description thus far progressed that, whenever the solid body is the plate 10 or another large structural element, the bore 12 need not extend from one surface through the entire body to another surface.

Moreover, if the self-tapping screw 20 is not perfectly aligned with the axis 14, the rib 22 urges or coerces the screw 20 to adjust into longitudinal alignment with the axis 14 while the screw is being driven. Thus, the thread 30 helically wound about the cylindrical shank portion of the screw 20 commences cutting into, and thread-forming the surface 18 of the bore 12 only when the longitudinal shank or axis of the screw 20 is in alignment with the axis 14. The action of the cutting or forming thread 30 at the conical portion of the screw 20, upon engagement with the rib 22, urges the screw 20 into perfect alignment gradually with each turn of the thread 30 and its engagement with the rib 22, it is believed.

As the screw 20 is rotatably advanced through the bore 12, the rib 22 and surface 18 of the bore 12 are reformed by the thread-forming, self-tapping thread 30 of the screw 20. Thus, if the screw 20 were to be disengaged from the bore 12, the bore 12 would have an internal surface, not shown in the drawings, having a female thread complemental to the thread 30 of the screw 20. All vestiges of the rib 22 would have disappeared, as the interior was reformed and made a complementally threaded bore.

Figure 8:
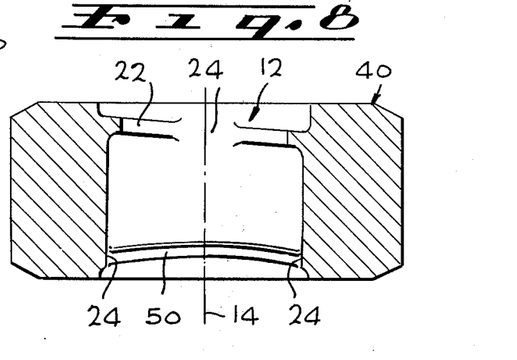
FIG. 8 is a cross-sectional view of a further embodiment of the invention.

It has been found in many applications that it is desirable to have the bore 12 constructed so that a self-tapping screw 20 can be inserted from either end of the cylindrical bore. In such a circumstance, it has been found that it is desirable to provide two ribs, as shown in FIG. 8, each rib being positioned relatively close to a distinct one of the two ends of the cylindrical bore 12, which, in this instance, extends all the way through the blank. The construction of a bore having two such ribs is quite feasible using the stamping method described above, but cannot be achieved with fasteners and their production methods used heretofore, such as broaching. In FIG. 8, the bore 12 is shown as having a rib 22 as well as a rib 50 each disposed near a different one of the two ends of the bore 12. The ribs 22, 50 may have voids 24 similar to the void 24 shown in FIGS. 1 or 4, for example.

If the stamping method of creating the ribs 22, 50 is employed, the interior of the bore 12 takes on an intricate shape as shown in FIG. 8. Again, as noted above, the quantity of material within The bore 12 is the same after the rib-forming steps as it was prior to these steps. As seen in FIG. 8, the diameter of the bore 12 at the ends of the bore 12 where the ribs 22 and 50 have been stamped is longer than the diameter in the centermost portions of the bore 12. In fact, where ribs are formed at opposite ends of a fastening device, such as nut 40 in FIG. 8, or where ribs are formed at either end of a bore in a relatively thin plate, such as plate 10, the diameter of the bore 12 between the two ribs 22, 50 is shorter than the bore diameter externally of the two ribs 22, 50. Nonetheless, the quantity of material which must be reformed by a thread-forming, self-tapping screw 20 when driven into the bore 12 having ribs protruding from interior surface 18 reformed as described above, is the same as if the ribs 22, 50 had not been formed and the interior surface 18 of the bore 12 were smooth as originally drilled or otherwise formed.

Figure 9:
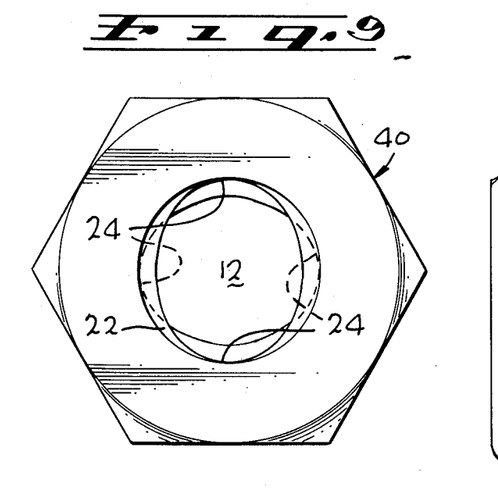
FIG. 9 Is a top view of the embodiment of FIG. 8.

In FIG. 9 is shown a top view of the nut 40 with the double-ribbed bore 12 of FIG. 8 having voids 24 provided in the ribs. Specifically, as shown, each rib has a pair of mutually oppositely located voids 24, with the voids in one rib being angularly offset by ninety degrees with respect to the voids in the other rib.

While voids 24 increase the workability of the self-straightening bore construction shown herein, by virtue of the oncoming self-tapping screw thread having its crest passing through a void, as can easily be imagined, it has been found that some alignment of the self-tapping screw 20 is made with the axis 14 of the bore 12 without these voids. However, when the voids 24 are present in the ribs 22, 50, or both, it has been found that the thread 30 on the conical portion of screw 20 engages, i.e. its crest passes through, the voids 24. The axis of the screw 20 is urged thereby into alignment with the axis 14, and the screw 20 is so aligned by the time the cylindrical portion of screw 20 begins thread-forming the material adjacent the wall surface 18 of the bore 12.

Positioning the voids 24 midway along either the rising half, the descending half or both of the two halves of the rib 22 which are oriented such that they have direction componenTs in mutually opposite senses insures an optimum axial distance between a void and the end of the bore. Thus, the ability of the screw 20, when driven into the bore, to have its thread 30 engage, i.e. being caught within, a void by virtue of the crest passing through the void is maximized. The thread 30, however, may be caught very well in such a void 24 placed at other points of the rib 22. It can be appreciated that, if all screws were threaded in the same helical direction, and assuming assembly in only one axial direction, a single void 24 on the rising half of the rib will provide the maximum opportunity for thread engagement. For example, if the screw being inserted has a right-hand helical thread, a void 24 in the right-turn, rising half of rib 22, when viewed in the assumed axial direction, would maximize the thread-catching capability.

Figure 10:
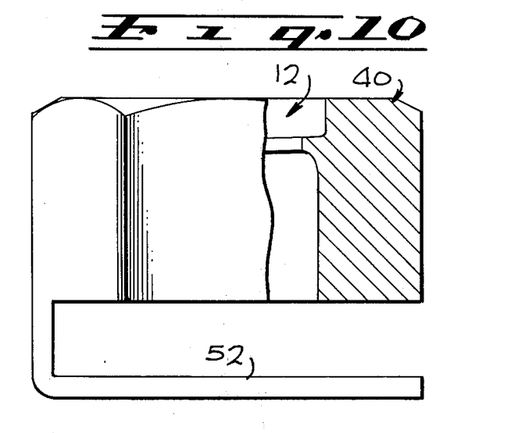
FIG. 10 is a cutaway, partly sectional view of yet another embodiment of the invention.

As is shown in the cutaway view of FIG. 10, nuts 40 having a U-shaped clamp 52 can be constructed. Similarly, but not shown, nuts having a well-known, conventionally J-shaped clamp can also be constructed utilizing the present invention.

Further, the rib 22 as described herein has been found most useful when formed in an extruded hole in a relatively thin sheet of suitable material, such as metal, as shown in FIG. 11. In this connection, it may be noted that the rib 22 of the extruded-hole version of the invention, as shown in FIG. 11, is located within the space defined by the planes of the two major surfaces of the original metal sheet in which the hole was formed. The rib is therefore fully supported by the surrounding metal, as the plate provides backing material which will prevent significant deformation of the outer periphery when a standard threaded fastener, such as a self-tapping screw, will be forcefully inserted into the hole.

Certain additional features of the invention will now be described in connection with the figures described thus far and also in connection with FIG. 12 of the drawings. More particularly, the matter of the final strength of the fastener assembly and the driving torque for inserting a self-tapping screw or other externally threaded fastener into a nut, such as that shown in FIG. 8, will now be considered. Initially, it is well known that the thread immediately adjacent the clamping surface of a fastener, such as a nut, carries the greatest stress and, therefore, is most important for providing strength to the fastener assembly. This is brought out in various publications, such as the article entitled "Controlling Fastener Reliability and Cost", pages 26 through 30 of the January 1763 issue of *Assembly Engineering*, in which particularly note page 27 and FIG. 2. In accordance with these analyses, the initial thread may be subject to as much as 250 percent of the average stress on a typical fastener, including a nut and a screw. By way of contrast, each of the central threads, i.e. turns of the thread, of a nut might carry only about 50 percent of the average stress, and the last thread or two away from the head of the screw might typically be stressed at levels well below 50 percent of the average stress. In view of this background, the importance of locating the rib immediately adjacent the clamping surface of the nut becomes apparent. For this reason and to insure the presence of at least one fully formed thread immediately adjacent the head of the externally threaded fastener, the ribs labeled 22 in the drawings are located close to the upper surface of the nut-like fastener 40 of FIGS. 7 through 10, and the corresponding clamping surfaces shown in the other figures of the drawings. More specifically, in FIG. 2, the rib 22 is located at a distance equal to approximately ten percent of the diameter of the bore from the upper surface of body 10. Similarly, in the other figures of the drawings, the ribs 22 are shown extending to points at a distance from the surface at the end of the bore in which the ribs are located which is about fifteen percent of the bore diameter.

With the rib extending toward the axis 14 of the bore to a diameter considerably less than the pitch diameter of the standard self-tapping screw to be used with the bore, at least one fully formed thread (or at least one turn of a thread which is fully formed) adjacent the head of the fastener is assured, and this provides the desired strength where the stress is highest.

Another problem with fasteners of the present type is the problem of driving torque. If a bore having a diameter equal to or less than the pitch diameter of the fastener to be used were employed, the driving torques would become excessive, and it would be impractical to use nut-like fasteners of the type shown in FIG. 8. However, by carefully, properly selecting the dimensions of the central bore beyond the rib to insure a diameter slightly greater than the pitch diameter of the standard externally threaded fastener to be employed with the fastener element of the invention, the driving torque, as well as radial pressures, can be significantly reduced withoUt impairing the overall strength of the fastener system. This result obtains, of course, from the fact that the low stress in this region of the threads does not require fully formed threads.

Figure 12:
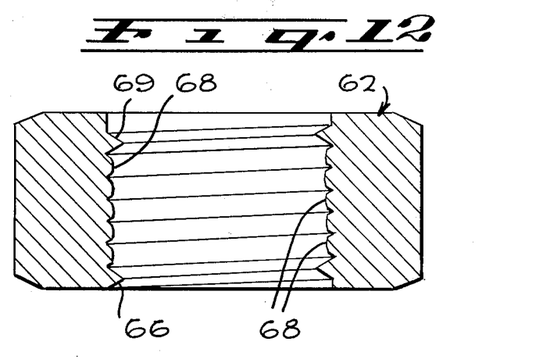
FIG. 12 is an axial cross-sectional view of a nut-type fastener as shown in FIG. 8, subsequent to assembly with and disassembly from a standard externally threaded self-tapping fastener.

FIG. 12 illustrates the principles described above. More specifically, FIG. 12 shows a nut-type fastener 62 of the type shown in FIG. 8 after having been assembled with and then disassembled from a suitable self-tapping screw. At each of the two ends of the bore are fully formed threads 64 and 66. Toward the center of the nut 62 are partially formed threads, or turns, 68 with incomplete crests, with these partially formed threads resulting from the use of an initial central bore diameter which is somewhat greater than the pitch diameter of the standard self-tapping screw which is to be employed with the nut-type fastener. Of course, if a bore diameter had been selected which was equal to the pitch diameter of the self-tapping thread, fully formed threads would be produced. However, the torque and power required to drive the standard screw into the nut 62 would have been greatly increased beyond that required for a full-strength nut. This involves, of course, the fact that threads beyond those closest to the end of the nut are subjected to greatly reduced stress and therefore do not need to be fully formed.

To provide a more specific example, ¼ inch self-tapping screws having twenty threads to an inch, known as a ¼–20 thread, normally have a pitch diameter equal to 0.2175 inch and a major diameter or outer diameter of 0.2489 inch. Nut-type fasteners implementing the present invention are provided with a central bore of approximately 0.223 to 0.225 inch, which is, of course, 0.007 to 0.008 inch greater than the pitch diameter, but 0.024 to 0.026 inch less than the major diameter of the screw. This insures a good "bite" into the wall of the bore, as shown at 68 in FIG. 12, but avoids the very high torque and radial pressures which would result in tight fit which would be required to form fully formed threads throughout the length of the nut 62.

Prior to forming the ribs, such as ribs 22 and 50 in FIG. 8, the nut-type fastener has the bore through it, of a diameter equal to approximately 0.223 inch to 0.225 inch, as noted above. Forming tools are then employed to enlarge the ends of the bore and to form the ribs 22 and 50. The forming tools may be as shown at 13 in FIG. 1 or as shown and described in my copending application Ser. No. 553,074, filed Feb. 25, 1975, entitled METHOD FOR USING AND APPARATUS FOR FORMING A TAPPING SCREW STRAIGHT START BORE. The outer diameter of the forming tool, of course; determines the resultant diameter of the bore of the nut-type fastener of FIG. 8 between the ribs and the adjacent ends of the bore or faces of the nut. This diameter should preferably be greater than the major or outer diameter of the self-tapping screw to be used; and, in the case of the ¼–20 tapping screw example set forth above, the diameter may be approximately 0.281 to 0.283 inch. This bore diameter at the ends of the bore is, of course, significantly greater than the outer diameter of the screw, which is 0.2489 inch which is about one-thousandth of an inch under the nominal ¼ inch (or 0.250 inch) size of the screw. Further, it is sufficiently greater than the central or previous bore size of 0.223 to 0.225 inch, to insure the formation of a substantial rib, even with relatively small penetration of the forming tool.

It is further noted that the body of the nut 62 should be of sufficient radial extent to avoid significant deformation or expansion of the nut 62. As such expansion occurs in accordance with the Holton U.S. Pat. Nos. 3,364,807 and 3,388,732, for example, there may be binding of the fastener into the socket or other wrench employed to engage the driving surfaces of the nut 62. It is also noted in passing that expansion-type fasteners, such as the nut-like fasteners disclosed in the Holton patents mentioned above tend to be for light-duty applications, and do not have the high strength required for heavy-duty industrial applications.

Concerning another feature of the present invention, it has been determined that the second, tightly fitting, fully formed thread resulting from the second rib in the nut-type fastener of FIG. 12 has additional utility. Thus, in addition to permitting bidirectional application of the nut, the second rib increases the prevailing torque of the fastener, which is the torque required for rotating the nut, when following loosening of the nut from its initial clamp load.

Concerning the driving torque found in arrangements employing principles of the present invention, it is useful to refer to specifications promulgated by the Industrial Fastener Institute, 1505 Eash Ohio Building, 1717 East 9th Street, Cleveland, Ohio 44114. In Specification I.F.I. No. 112, promulgated by this nationally recognized Institute, certain figures are provided indicating the recommended maximum allowable torque for tapping screws. These specifications appear in Table 2 on page 6 of the 10-page paper which is entitled "High Performance Thread Rolling Screws". In this specification, the maximum torque for ¼–20 screws is 90 inch-pounds. Using the specific proportions and dimensions set forth hereinabove in the present specification, in connection with the description of the ¼–20 nut-type fastener for which dimensions were listed, the maximum torque obtained when a ¼–20 screw was driven or tapped into the nut-type fastener, was 73 inch-pounds. This torque is, of course, well below the maximum specified in the I.F.I. paper identified above.

In addition to driving torque, another important specification for nut- and bolt-type fasteners is the so-called "prevailing torque". In this connection, reference is made to the Industrial Fastener Institute Specification No. 124 in which Table 1 on page 4 of the five-page specification gives "Prevailing Torques for Non-Metallic Locking Element Type Locking Screws". By way of explanation, reference is being made to screws having non-metallic inserts, such as the nylon buttons which are used in NY-LOK self-locking screws. In this table, the ¼–20 screw specification for the first removal is five inch-pounds. This "first off" measure of prevailing torque is measured using a torque wrench by loosening the screw following a firm tightening of the screw, and as soon as the clamp load is released, the screw or nut is rotated through an additional 360° and the maximum torque is recorded. As compared with the five inch-pounds constituting the "first off" figure for ¼–20 screws as appearing in the table identified above, the nut-type fasteners of the present invention in the ¼–20 size, had a prevailing torque of 11 inch-pounds. This higher level of prevailing torque is, of course, most useful in avoiding the shaking loose of bolts from the threaded fastener to which they are engaged, under conditions of high vibration.

It should be noted that, while the drawings and the foregoing specification illustrate and describe the rib as being essentially a flat ring, such description is meant to be that of a special, preferred embodiment. Other alternative applications and forms of the fastener of the invention, not shown, may be discovered without departing from the scope of the hereindescribed invention, it can be appreciated.

What is claimed is:

1. A fastening element for forming a fastener assembly by engagement with a self-tapping screw comprising:
   a. a solid body having a threadless cylindrical surface developing a circular bore extending into said solid body and defining a longitudinally extending axis,
   b. at least one elliptical rib protruding radially inwardly into said bore along an elliptical close-loop line upon said cylindrical surface of said bore,
   c. two turning points of reversal in axial direction component in said closed-loop line defining a maximum and minimum in axial extent of said elliptical rib,
   d. a rising rib portion in said elliptical rib extending from said minimum axial extent and a descending rib portion extending from said maximum axial extent, and
   e. at least a portion of at least one interruption of said elliptical rib in said rising rib portion on said closed-loop line so that at least one void is developed by said interruption in said elliptical rib.

2. Fastening element according to claim 1, wherein said rib is defined by two planes each oriented obliquely with respect to said axis of said bore.

3. Fastening element according to claim 1, wherein said rib has two substantially elliptically ring-shaped major surfaces, each of the major surfaces lying in a plane forming an acute angle with a plane intersecting said axis of said bore at right angles.

4. Fastening element according to claim 3, wherein said two major surfaces form a relatively small angle between one another, with the thickness of said rib included between the two surfaces increasing with the depth of said rib.

5. Fastening element according to claim 1, wherein said rib is provided in an area of said solid body at which a wall thickness of said solid body is sufficiently great that assembly with said self-tapping screw cannot cause significant distortion of the external shape of said solid body.

6. Fastening element according to claim 5, wherein the overall external configuration of said solid body is that of a nut having substantially the same radial external dimensions along its height.

7. Fastening element according to claim 5, wherein the overall external configuration of said solid body is that of a flat plate.

8. Fastening element according to claim 1, comprising at least one rib adjacent an end of said bore.

9. Fastening element according to claim 1, comprising two ribs, each adjacent a distinct one of two ends of said bore.

10. Fastening element according to claim 1, comprising at least two voids.

11. Fastening element according to claim 10, wherein one of said two voids is in said rising rib portion and the other of said two voids is in said decending rib portion.

12. Fastening element according to claim 10, wherein said two voids are at diametrically opposite locations in said closed-loop line.

13. Fastening element according to claim 11, wherein said two voids are at equal distances from an end of said bore.

14. Fastening element according to claim 1, wherein a said rib is spaced from one end of said bore by a distance less than fifteen percent of the diameter of the bore.

15. A fastening member for forming a fastener assembly by engagement with a standard externally threaded self-tapping threaded fastener having predetermined outer and pitch diameters, comprising:
   a. a body having a central bore of a diameter substantially greater than said pitch diameter and substantially less than said outer diameter;
   b. a formed elliptical rib spaced from one end of said bore by a distance less than 15 percent of the diameter of said bore;
   c. said elliptical rib extending inwardly toward the axis of said bore for most of the circumference of said bore along an elliptical closed-loop line upon said surface of said bore;
   d. two turning points of reversal in axial direction component in said closed-loop line defining a maximum and minimum in axial extent of said elliptical rib;
   e. a rising rib portion in said elliptical rib extending from said minimum axial extent and a descending rib position extending from said maximum axial extent;
   f. said elliptical rib having at least one void on said closed-loop line;
   g. means including backing material enclosing said bore for preventing significant enlargement of said bore as threads are formed herein by said standard externally threaded fastener; and h. said bore having an enlarged portion between the end of said bore and said formed rib, said enlarged portion having a diameter greater than said outer diameter;

whereby said standard externally threaded fastener is aligned with and engages said fastening member readily, and said fastening member will have at least one fully formed thread within said bore and near the surface of said body for maximum holding strength combined with reduced driving torque and radial pressure with only partially formed threads in said central bore beyond said elliptical rib.

16. A fastening member as defined in claim 15, wherein two of said ribs are provided, one near each end of said bore.

17. A fastening member as defined in claim 15, wherein said rib is elliptical in configuration and is located substantially in a plane which intersects at an acute angle a plane perpendicular to the axis of said bore.

18. A fastening member as defined in claim 16, further including driving surfaces defining the extent of said body beyond said backing material.

19. A nut-type fastening element for forming a fastener assembly by engagement with an externally threaded self-tapping fastener, comprising:
 a. a solid body having a central threadless cylindrical surface defining a bore and extending through said body;
 b. two ribs each being of substantially elliptical configuration and each protruding radially inwardly into said bore adjacent a different one of the two ends of said bore from locations along a substantially elliptical closed-loop line upon the cylindrical surface of said bore, each of said closed-loop lines having two turning points of reversal in axial direction component in each said closed-loop line, one point which is closed to the adjacent end of said bore defining a maximum turning point in axial extent of said elliptical rib and another point which is diametrically opposed and which is farther away from the adjacent end of said bore defining a minimum turning point in axial extent of said elliptical rib;
 c. each said rib further having at least one void at a location between the maximum and minimum axial extent points along said elliptical closed-loop line;
 d. the thickness of each said rib increasing with the depth of said rib from the adjacent end of said bore;
 e. the diameter of said bore between said two ribs being less than the diameter of said bore between each rib and the adjacent end of said bore;
 f. the outer periphery of said nut-type fastening element being provided with surfaces formed for engagement by a wrench; and
 g. means including backing material between said bore and said outer periphery for preventing significant deformation of said surfaces when said externally threaded fastener engages and forms threads in said bore.

20. Fastening element according to claim 19, wherein said void in each of said rib being angularly off set with respect to the void in the other rib.

* * * * *